(12) United States Patent
Bogdanski

(10) Patent No.: US 10,895,175 B2
(45) Date of Patent: Jan. 19, 2021

(54) FORCE TRANSMISSION DEVICE FOR VARIABLE VALVE DRIVE

(71) Applicant: MAN Truck & Bus AG, Munich (DE)

(72) Inventor: Peter Bogdanski, Schwabach (DE)

(73) Assignee: MAN TRUCK & BUS AG, Munich (DE)

( * ) Notice: Subject to any disclaimer, the term of this patent is extended or adjusted under 35 U.S.C. 154(b) by 0 days.

(21) Appl. No.: 16/104,507

(22) Filed: Aug. 17, 2018

(65) Prior Publication Data
US 2019/0055858 A1 Feb. 21, 2019

(30) Foreign Application Priority Data
Aug. 18, 2017 (DE) .......... 10 2017 118 852

(51) Int. Cl.
| | | |
|---|---|---|
| F01L 1/18 | (2006.01) | |
| F01L 13/00 | (2006.01) | |
| F01L 1/053 | (2006.01) | |
| F01L 1/22 | (2006.01) | |
| F01L 1/24 | (2006.01) | |
| F16H 25/10 | (2006.01) | |
| F16H 25/14 | (2006.01) | |
| F01L 1/20 | (2006.01) | |

(52) U.S. Cl.
CPC .............. F01L 1/181 (2013.01); F01L 1/053 (2013.01); F01L 1/22 (2013.01); F01L 1/2416 (2013.01); F01L 13/0036 (2013.01); F16H 25/10 (2013.01); F16H 25/14 (2013.01); *F01L 1/20* (2013.01); *F01L 2001/186* (2013.01); *F01L 2305/00* (2020.05)

(58) Field of Classification Search
CPC ..... F01L 1/053; F01L 2001/186; F01L 1/181; F01L 1/2416; F01L 1/267; F01L 1/46; F01L 13/0005; F01L 13/0036; F01L 2305/00
USPC ......... 123/90.16, 90.39, 90.44, 90.27, 90.36, 123/90.46
See application file for complete search history.

(56) References Cited

U.S. PATENT DOCUMENTS

| | | | |
|---|---|---|---|
| 4,726,332 A | 2/1988 | Nishimura et al. | |
| 5,701,857 A * | 12/1997 | Hara | F01L 1/267 123/198 F |
| 6,499,451 B1 * | 12/2002 | Hendriksma | F01L 1/08 123/90.16 |

(Continued)

FOREIGN PATENT DOCUMENTS

| | | |
|---|---|---|
| DE | 3613945 A1 | 10/1986 |
| DE | 4025569 C1 | 7/1991 |

(Continued)

*Primary Examiner* — Jorge L Leon, Jr.
(74) *Attorney, Agent, or Firm* — Weber Rosselli & Cannon LLP

(57) ABSTRACT

A force transmission device for a variable valve drive of an internal combustion engine. The force transmission device has a first lever device. The first lever device has a first cam follower and a first receptacle for the first cam follower. The first cam follower is displaceable and lockable in the first receptacle. The force transmission device has a second lever device. The second lever device has a second cam follower and a second receptacle for the second cam follower. The second cam follower is displaceable and lockable in the second receptacle.

17 Claims, 3 Drawing Sheets

(56) References Cited

U.S. PATENT DOCUMENTS

| | | | |
|---|---|---|---|
| 7,086,360 B1* | 8/2006 | Schnell | F01L 1/146 123/90.16 |
| 8,714,125 B2* | 5/2014 | Kamichika | F01L 1/047 123/90.16 |
| 2009/0044774 A1* | 2/2009 | Schwitters | F01L 1/146 123/90.39 |
| 2009/0107428 A1* | 4/2009 | Magnan | F01L 13/0005 123/90.12 |
| 2009/159029 A1 | 6/2009 | Kuhl et al. | |
| 2012/0325168 A1* | 12/2012 | Nitz | F01L 13/0042 123/90.17 |
| 2015/0159521 A1 | 6/2015 | Baltrucki et al. | |
| 2017/0241305 A1* | 8/2017 | Xi | F01L 1/08 |
| 2018/0306073 A1* | 10/2018 | McCarthy, Jr. | F01L 1/2422 |

FOREIGN PATENT DOCUMENTS

| | | |
|---|---|---|
| DE | 4335431 A1 | 4/1995 |
| DE | 19914046 A1 | 9/2000 |
| DE | 102005027526 A1 | 1/2006 |
| DE | 102006034951 A1 | 3/2007 |
| EP | 1588027 B1 | 9/2010 |
| FR | 2709149 A1 | 2/1995 |
| JP | S57182205 U | 11/1982 |
| JP | S61105706 U | 7/1986 |
| JP | H04109010 A | 4/1992 |

\* cited by examiner

FORCE TRANSMISSION DEVICE FOR VARIABLE VALVE DRIVE

BACKGROUND

The present disclosure relates to a force transmission device for a variable valve drive of an internal combustion engine with a first and a second lever device, in particular a first and a second rocker lever. The present disclosure also relates to a variable valve drive having the force transmission device.

It is generally known to use variable valve drives for varying switching times and valve strokes of gas exchange valves of an internal combustion engine during the operation of the internal combustion engine. A multiplicity of variable valve drives is known from the prior art.

DE 10 2006 034 951 A1 relates to a valve drive for an internal combustion engine, having a switchable rocker lever construction with multiple rocker levers for actuating at least one gas exchange valve. The valve drive has a switchover device with locking pins for changing a respectively acting rocker lever for a drive of the gas exchange valve with a varying valve stroke.

EP 1 588 027 B1 relates to a valve drive for piston-type internal combustion engines, in the case of which a first rocker lever is in operative contact with at least one first cylinder valve, at least one additional cam is in operative contact with a second rocker lever, and the second rocker lever can be placed in a force flow with the first rocker lever by means of an actuating element.

DE 40 25 569 C1 discloses a valve controller of an internal combustion engine which is switchable as a drive or brake, with outlet valves which are controlled differently in the driving and braking functions by a camshaft by means of control rocker levers, which outlet valves are, in the braking function, acted on not only by the cam that acts in the drive function but also by a further auxiliary cam (braking cam). In each case coaxially with respect to a control rocker lever of an outlet valve, there is mounted a braking rocker lever which is guided by a braking cam and which bears resiliently against said braking cam and which, in braking operation, is lockable to the control rocker lever.

SUMMARY

The present disclosure is based on the object of providing an alternative or improved force transmission device for a variable valve drive. In particular, it is sought to provide a force transmission device which permits a reliable and simple variation of a valve stroke of a gas exchange valve. In one embodiment the present disclosure provides a force transmission device which permits two mutually independent valve stroke curves of at least one gas exchange valve which is operatively connected to the force transmission device. Here, simple actuation may be possible, which does not require cylinder-selective actuation/switchover, such that multiple cylinders can be switched over simultaneously and independently of one another.

The force transmission device is suitable for a variable valve drive of an internal combustion engine with at least one gas exchange valve and with a camshaft having a first cam and a second cam. The force transmission device has a first lever device by means of which an operative connection can be produced between the first cam and the at least one gas exchange valve. The first lever device has a first cam follower, which makes contact with the first cam, and a first receptacle for the first cam follower. The first cam follower is, in particular axially, displaceable and lockable in the first receptacle. The force transmission device has a second lever device, by means of which an operative connection can be produced between the second cam and the at least one gas exchange valve. The second lever device has a second cam follower, which makes contact with the second cam, and a second receptacle for the second cam follower. The second cam follower is, in particular axially, displaceable and lockable in the second receptacle.

The force transmission device permits a switchover between the first cam and the second cam for the actuation of the at least one gas exchange valve. In this way, the at least one gas exchange valve can be controlled with two entirely mutually independent valve stroke control curves. The integration of the switching functionality into the first and second lever devices is furthermore expedient in terms of structural space.

In one exemplary embodiment, the first cam follower is mounted displaceably in the first receptacle for the purposes of compensating a cam contour of the first cam, and the first cam follower is lockable in the first receptacle for the purposes of transmitting the cam contour of the first cam to the at least one gas exchange valve. Alternatively or in addition, the second cam follower is mounted displaceably in the second receptacle for the purposes of compensating a cam contour of the second cam, and the second cam follower is lockable in the second receptacle for the purposes of transmitting the cam contour of the second cam to the at least one gas exchange valve. If for example a displacement movement of the first cam follower of the first receptacle is enabled, that is to say the first cam follower is not locked, the first cam follower performs a back-and-forth movement in the first receptacle as it follows the cam contour of the first cam. The cam contour of the first cam is compensated by means of the back-and-forth movement of the first cam follower. The cam contour of the first cam is not transmitted to the at least one gas exchange valve. If, for example, the second cam follower is additionally locked, the second cam follower is prevented from performing a back-and-forth movement, which compensates the cam contour of the second cam, in the second receptacle. Thus, the cam contour of the second cam is transmitted to the at least one gas exchange valve.

In one exemplary embodiment, selectively the first cam follower or the second cam follower is locked. Via the locked cam follower, a cam contour of the corresponding cam can be transmitted to the at least one gas exchange valve. The released (non-locked) cam follower compensates the cam contour of the corresponding cam by means of a displacement in the receptacle. Thus, the at least one gas exchange valve is actuated by the cam contour either of the first cam or of the second cam.

In a further exemplary embodiment, the first cam follower and/or the second cam follower is hydraulically lockable. For example, a cam follower can be released or locked by means of a supply of a control fluid.

It is possible, by means of a central control fluid supply, for example, for a multiplicity of force transmission devices to be supplied with control fluid for locking and releasing the cam followers of the force transmission devices. This offers the possibility of implementing simplified control of the multiple force transmission devices, because there is no need for cylinder-selective switching. Instead, multiple force transmission devices can be switched jointly. In this way, the switching effort can be greatly reduced, because a switchover between the cam profiles can be performed in any desired cam angle position (cam-angle-independent switching).

In a design variant, the first lever device is formed as a rocker lever, and/or the second lever device is formed as a rocker lever.

In a further design variant, the second lever device is rigidly connected to the first lever device. Alternatively or in addition, the second lever device is supported on the first lever device via a play setting device, in particular a setting screw. By means of the play setting device, a one-off setting of a play between the first lever device and the second lever device can be performed, for example for the purposes of compensating manufacturing and assembly tolerances. Since no relative movement occurs between the first lever device and the second lever device during operation, the play only has to be set once before the internal combustion engine is operated for the first time.

In one refinement, the second lever device, in particular the setting screw, may for example be supported on a projection which extends from a main body region of the first lever device. In particular, the projection may extend from the main body region of the first lever device in a direction parallel to the camshaft and/or lever axle of the first lever device and of the second lever device.

In a further design variant, the first lever device has a rotational securing means which prevents a rotation of the first cam follower about a displacement axis of the first cam follower. Alternatively or in addition, the second lever device has a rotational securing means which prevents a rotation of the second cam follower about a displacement axis of the second cam follower. The rotational securing means ensure that an orientation of the first cam follower and of the second cam follower with respect to the first cam and the second cam is maintained during operation.

For example, the rotational securing means may engage longitudinal openings or longitudinal grooves of actuating pistons in which the cam followers are mounted.

The first rotational securing means, in conjunction with the corresponding longitudinal groove, may form an axial stop for a first actuating piston. Alternatively or in addition, the second rotational securing means, in conjunction with the corresponding longitudinal groove, may form an axial stop for a second actuating piston.

In one embodiment, the first lever device has at least one displaceable blocking piston which can be loaded hydraulically and which is designed for locking the first cam follower.

The at least one blocking piston may be displaceable in a radial direction with respect to a longitudinal axis of the receptacle.

It is possible for the at least one blocking piston to be able to engage into a circumferential groove of the first receptacle for the purposes of locking the first cam follower.

For example, at least one control fluid supply channel for the supply of control fluid may open into the circumferential groove, such that the at least one blocking piston can be moved out of engagement with the circumferential groove. In this way, a displacement movement of the first cam follower can be enabled.

The blocking piston may be mounted in displaceable fashion in a first actuating piston, which can also serve for the mounting of the first cam follower.

It is possible for a movement of the at least one blocking piston to be enabled only in the presence of a substantially force-free operative connection of the camshaft to the gas exchange valve via the force transmission device. It is thereby ensured in a simple manner that a switchover between the first lever device and the second lever device takes place only in the base circle region, and thus a simple, non-cylinder-selective switchover is made possible.

In one exemplary embodiment, the at least one blocking piston is elastically preloaded, in particular so as to lock the first cam follower. In this way, it is firstly possible for a resetting movement of the at least one blocking piston into an initial position to be ensured. Secondly, this also permits a fail-safe functionality, whereby, in the event of a failure of the control fluid supply, the first cam follower is moved into an operationally reliable, defined position.

In a further exemplary embodiment, a rotational securing means is provided for the at least one blocking piston, which rotational securing means prevents a rotation of the at least one blocking piston about a displacement axis of the blocking piston.

In one design variant, the second lever device has a pressure chamber which can be loaded hydraulically and which is designed for locking the second cam follower. When loaded hydraulically, the pressure chamber can for example serve as a pressure cushion which prevents a displacement of the second cam follower in the second receptacle. In the absence of hydraulic loading, the second cam follower can for example move back and forth in the second receptacle.

A region, in particular a base region, of the second receptacle forms the pressure chamber. The pressure chamber may for example be defined between a base surface of the second receptacle and an end surface of an actuating piston that serves for the mounting of the second cam follower.

In a further design variant, the at least one blocking piston and the pressure chamber can be jointly loaded hydraulically. This reduces the control effort and can at the same time ensure that there is always an operative connection to the at least one gas exchange valve.

In one embodiment, a control fluid supply for the hydraulic locking and release of the first cam follower and of the second cam follower takes place via a common lever axle, in particular rocker lever axle, of the first lever device and of the second lever device, via a lever axle longitudinal channel of the lever axle.

In a further embodiment, the at least one blocking piston enables a displacement movement of the first cam follower in the presence of hydraulic loading of the blocking piston. Alternatively or in addition, the at least one blocking piston locks the first cam follower in the absence of hydraulic loading of the blocking piston.

In a further design variant, the pressure chamber locks the second cam follower in the presence of hydraulic loading of the pressure chamber. Alternatively or in addition, the pressure chamber enables a displacement movement of the second cam follower in the absence of hydraulic loading of the pressure chamber.

In one exemplary embodiment, the first cam follower is mounted in a first actuating piston which is mounted in axially displaceable fashion in the first receptacle. Alternatively or in addition, the second cam follower is mounted in a second actuating piston which is mounted in axially displaceable fashion in the second receptacle.

In a further exemplary embodiment, the force transmission device furthermore has a control fluid supply for the hydraulic unlocking of the first cam follower and for the hydraulic locking of the second cam follower, and a lubricating fluid supply, provided separately from said control fluid supply, for the lubrication of a rotational movement of the first cam follower and of the second cam follower.

It is possible for the first lever device and the second lever device to be mounted so as to be pivotable about a common lever axle, in particular rocker lever axle.

The cam follower of the first lever device and/or the cam follower of the second lever device may be formed as a rotatable roller.

The cam contour of the first cam may differ from the cam contour of the second cam.

It is possible for the first cam follower and/or the second cam follower to be elastically preloaded in one direction with respect to the camshaft.

It is also possible for the first lever device and/or the second lever device to be elastically preloaded in one direction with respect to the camshaft for example by means of a rotary spring.

According to a further aspect, the present disclosure also relates to a variable valve drive for an internal combustion engine. The variable valve drive has a camshaft with a first cam and with a second cam which is arranged offset with respect to the first cam in a longitudinal direction of the camshaft. The variable valve drive has at least one gas exchange valve and a force transmission device as disclosed herein.

The present disclosure also relates to a motor vehicle, in particular a utility vehicle (for example a heavy goods vehicle or a bus) with a variable valve drive as disclosed herein or with a force transmission device as disclosed herein.

The above-described embodiments and features of the present disclosure may be combined with one another as desired.

BRIEF DESCRIPTION OF THE DRAWINGS

Further details and advantages of the present disclosure will be described below with reference to the appended drawings, in which.

The embodiments shown in the figures at least partially correspond, such that similar or identical parts are denoted by the same reference designations and, for the explanation thereof, reference will also be made to the description of the other embodiments and figures in order to avoid repetitions.

DETAILED DESCRIPTION

Figure 1:
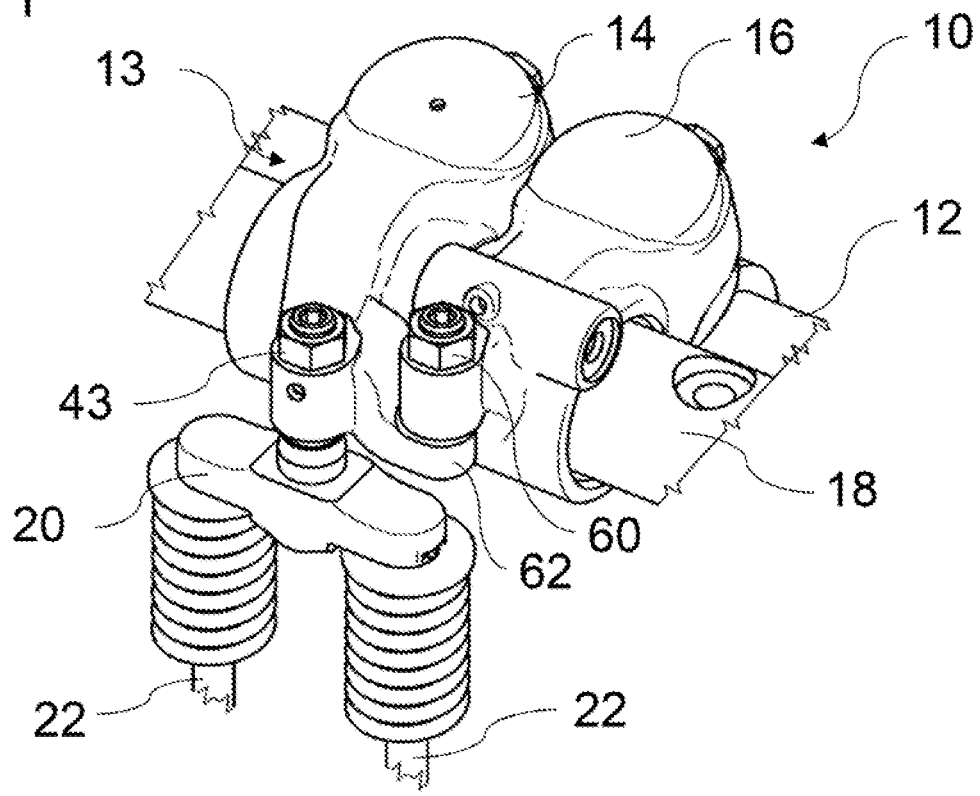
FIG. 1 shows a perspective view of a variable valve drive with an exemplary force transmission device.

FIG. 1 illustrates a variable valve drive 10. The variable valve drive 10 has a camshaft 12 and a force transmission device 13 with a first rocker lever 14, with a second rocker lever 16 and with a rocker lever axle 18. The variable valve drive 10 furthermore has a valve bridge 20 and two gas exchange valves 22.

The first rocker lever 14 and the second rocker lever 16 are mounted so as to be pivotable about the rocker lever axle 18. The gas exchange valves 22 can, by means of the valve bridge 20, be selectively actuated by means of the first rocker lever 14 or the second rocker lever 16, as will be described in detail further below. The gas exchange valves 22 may be formed as inlet valves or as outlet valves.

It is also possible for no valve bridge to be provided, and for example for only one or two gas exchange valves to be directly selectively actuated by the first rocker lever 14 or the second rocker lever 16.

In other embodiments, instead of the rocker levers 14, 16, other lever devices, for example finger-type rockers, may be used for actuating at least one gas exchange valve. Then, the lever devices are designed such that selectively a first lever device or a second lever device actuates the at least one gas exchange valve.

Referring to FIGS. 1 to 5, the configuration of the variable valve drive 10, and in particular of the force transmission device 13, will be described below.

The first rocker lever 14 has a first cam follower 24, a first actuating piston 26, two blocking pistons 28, and a first actuating piston receptacle 30.

The first cam follower 24 follows a cam contour of a first cam 32 of the camshaft 12. The first cam follower 24 is formed as a rotatably mounted roller. The first cam follower 24 is rotatable about a first cam follower axle 34. The first cam follower axle 34 is mounted in the first actuating piston 26.

Figure 2:
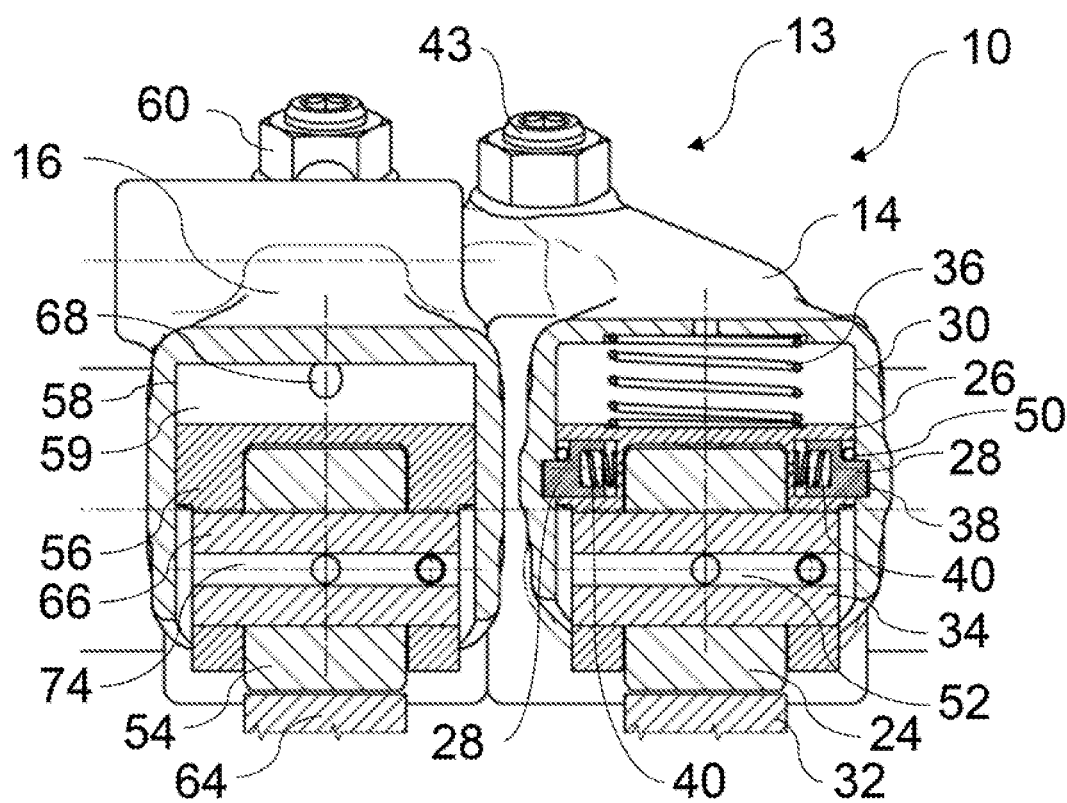
FIG. 2 shows a sectional view through the variable valve drive with a section plane parallel to the longitudinal axis of the camshaft.
Figure 3:
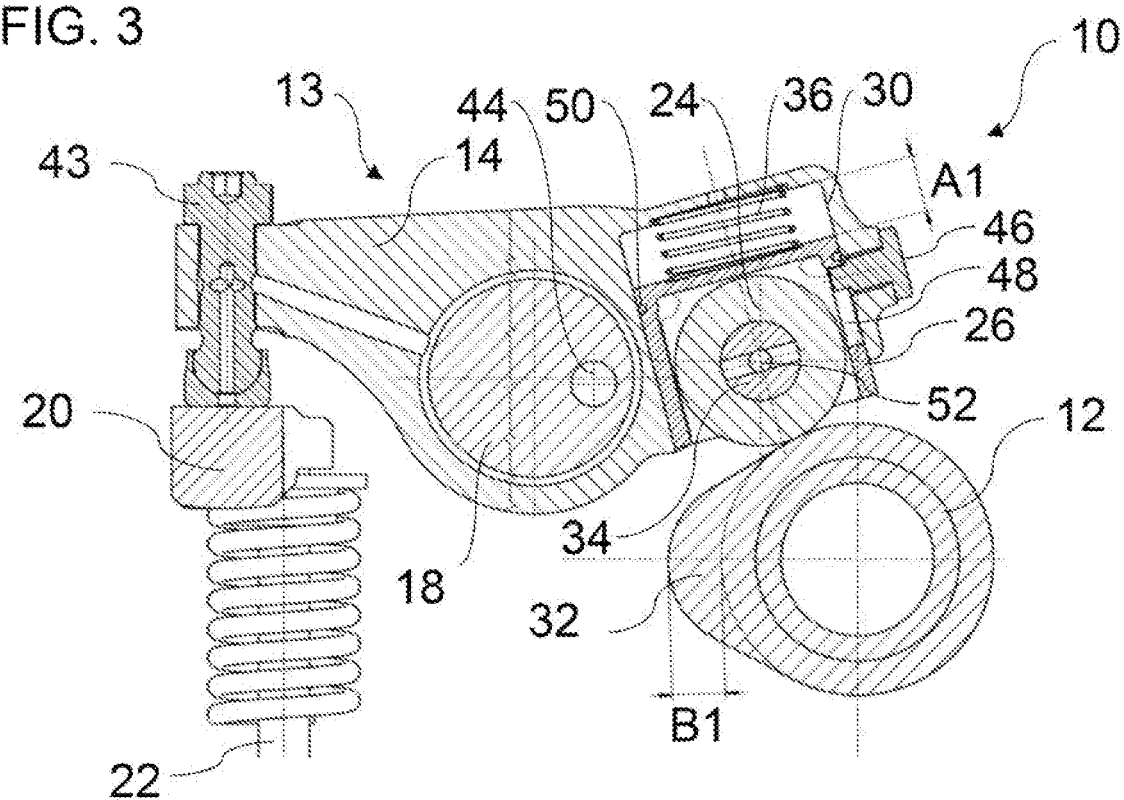
FIG. 3 shows a sectional view through a first lever device of the variable valve drive with a section plane perpendicular to the longitudinal axis of the camshaft.
Figure 4:
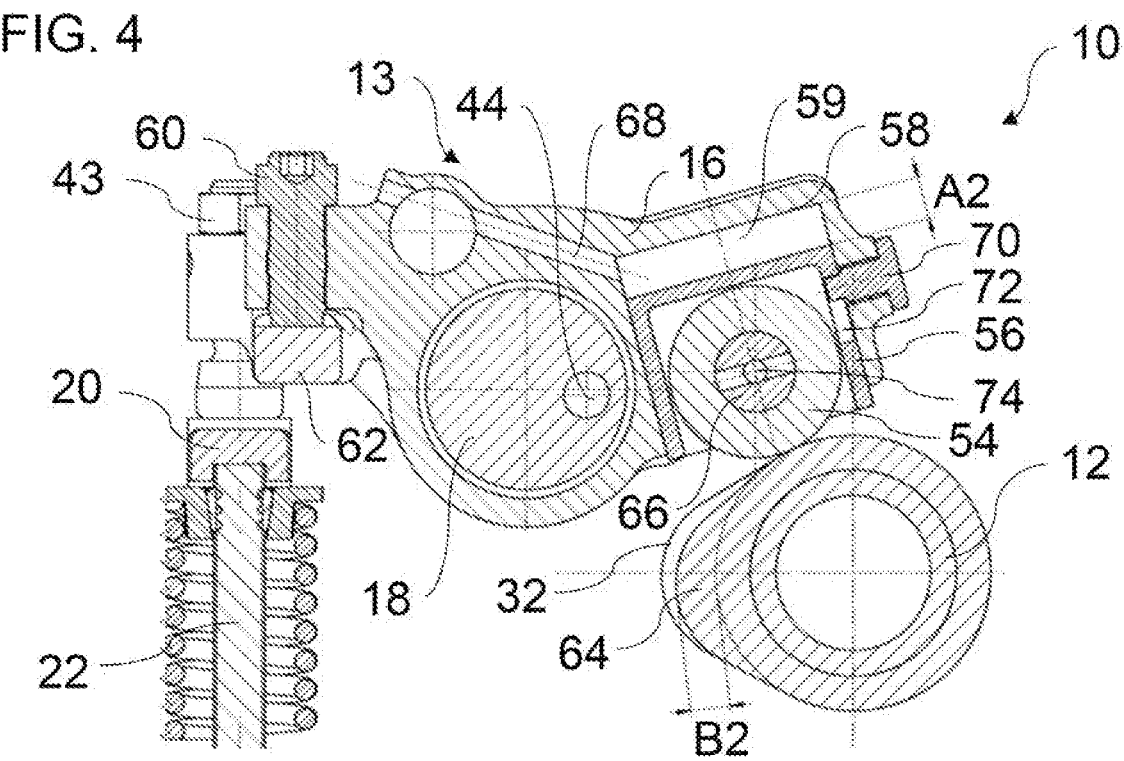
FIG. 4 shows a sectional view through a second lever device of the variable valve drive with a section plane perpendicular to the longitudinal axis of the camshaft.
Figure 5:
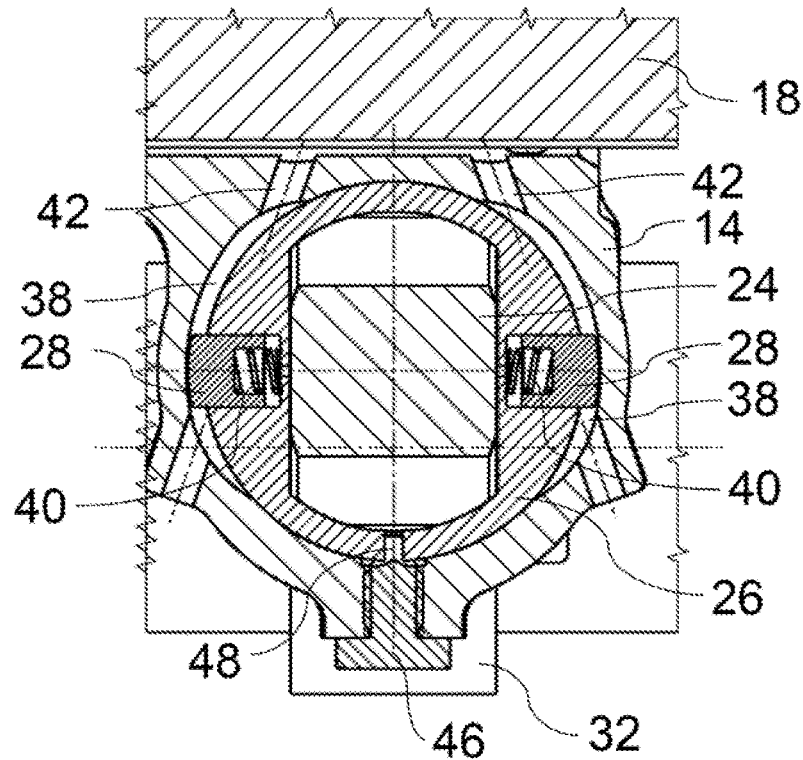
FIG. 5 shows a sectional view through a first lever device of the variable valve drive with a section plane parallel to the longitudinal axis of the camshaft and perpendicular to the section plane of FIG. 3.

The first actuating piston 26 is mounted displaceably in the first actuating piston receptacle 30. An elastic element 36, for example a resetting spring, resets the first actuating piston 26 and thus the first cam follower 24 in a direction of the first cam 32. A displacement of the first actuating piston 26 can be blocked by the blocking piston 28, as illustrated in FIG. 2 and FIG. 5. Thus, the first actuating piston 26 can be locked in the first actuating piston receptacle 30.

The blocking pistons 28 are mounted displaceably in the first actuating piston 26. The blocking pistons 28 are displaceable in a direction perpendicular to a displacement axis of the first actuating piston 26. The blocking pistons 28 can engage into a circumferential groove 38 of the first actuating piston receptacle 30. If the blocking pistons 28 engage into the circumferential groove 38, a displacement of the first actuating piston 26 within the first actuating piston receptacle 30 is blocked. The blocking pistons 28 are preloaded by means of elastic elements 40, for example resetting springs, in a blocking position in which the blocking pistons 28 engage into the circumferential groove 38. To permit a displacement of the first actuating piston 26, control fluid can be conducted to the circumferential groove 38 via one or more control fluid supply channels 42. The supplied control fluid has the effect that the blocking pistons 28 move in a direction toward one another. The blocking pistons 28 pass out of engagement with the circumferential groove 38. A displacement movement of the first actuating piston 26 is enabled.

If a displacement of the first actuating piston 26 is blocked, a cam contour of the first cam 32 is transmitted via the first cam follower 24 to the gas exchange valves 22. Here, the first rocker lever 14 tilts about the rocker lever axle 18 and, via a first setting screw 43, actuates the valve bridge

20 so as to open the gas exchange valves 22. By means of the first setting screw 43, a valve play can be set and readjusted.

If a displacement of the first actuating piston 26 is enabled, a cam contour of the first cam 32 is compensated by means of a displacement of the first cam follower 24 within the first actuating piston receptacle 30. The cam contour of the first cam 32 is not transmitted to the gas exchange valves 22. To permit a compensation, a clearance A1 (see FIG. 3) of the first actuating piston receptacle 30 can be greater than a maximum height B1 (see FIG. 3) of the first cam 32. The size of the clearance A1 may for example be dependent on an arrangement of the cam profiles of the two cams 32, 64 relative to one another.

The control fluid supply channels 42 are supplied with control fluid via a main control fluid channel 44. The main control fluid channel 44 is formed as a lever axle longitudinal bore. It is thus possible for not only the rocker levers 14, 16 of the force transmission device 13 to be supplied with control fluid. Further rocker levers of further force transmission devices (not illustrated) of similar or identical construction can additionally be supplied with control fluid from the main control fluid channel 44. This permits simultaneous and joint switching of multiple force transmission devices, such that there is no need for cylinder-selective switching. This can greatly reduce the control effort.

To prevent a rotation of the first actuating piston 26 about a displacement axis of the first actuating piston 26, a first rotational securing means 46 is provided. The displacement axis of the first actuating piston 26 coincides with a longitudinal axis of the first actuating piston receptacle 30. The first rotational securing means 46 engages into a longitudinal groove 48 of the first actuating piston 26. The longitudinal groove 48 runs parallel to the longitudinal axis of the first actuating piston receptacle 30. Thus, the first rotational securing means 46 permits only a movement of the first actuating piston 26 along the longitudinal axis of the first actuating piston receptacle 30. It can thus be ensured that the first cam follower 24 remains in the correct orientation with respect to the camshaft 12. Furthermore, the rotational securing means 46, in conjunction with the longitudinal groove 48, forms an axial stop for the first actuating piston 26. The first rotational securing means 46 may for example be of pin-like or screw-like form with a tapering front end.

To prevent a rotation of the blocking piston 28 about a displacement axis of the blocking piston 28, a second rotational securing means 50 is provided. The second rotational securing means 50 is ring-shaped and arranged in a circumferential groove of the first actuating piston 26.

For the lubrication of a rotation of the first cam follower 24, the first cam follower axle 34 has a first lubricating fluid longitudinal channel 52. Via a radial channel, lubricating fluid from the first lubricating fluid longitudinal channel 52 can be conducted between the contact surfaces of the first cam follower 24 and the first cam follower axle 34. The lubricating fluid longitudinal channel is connected to a lubricating fluid supply. The lubricating fluid supply is provided separately from the control fluid supply for the supply of control fluid to the main control fluid channel 44.

The second rocker lever 16 has a second cam follower 54, a second actuating piston 56 and a second actuating piston receptacle 58.

The second rocker lever 16 is rigidly connected by means of a second setting screw 60 to the first rocker lever 14. In detail, the second setting screw 60 is seated on a projection (a lug) 62 of the first rocker lever 14. The projection 62 extends from a main body region of the first rocker lever 14 in a direction parallel to the rocker lever axle 18. By means of the second setting screw 60, a play that may arise between the first rocker lever 14 and the second rocker lever 16 owing to manufacturing tolerances can be set.

The second cam follower 54 follows a cam contour of a second cam 64 of the camshaft 12. The second cam follower 54 is formed as a rotatably mounted roller. The second cam follower 54 is rotatable about a second cam follower axle 66. The second cam follower axle 66 is mounted in the second actuating piston 56.

The second actuating piston 56 is mounted displaceably in the second actuating piston receptacle 58. Control fluid can be supplied in a region (pressure chamber) 59 of the second actuating piston receptacle 58 that extends between a base surface of the second actuating piston receptacle 58 and the second actuating piston 56. The control fluid may be supplied via a control fluid supply channel 68. The control fluid supply channel 68 is fluidically connected to the main control fluid channel 44. If the pressure chamber is charged with control fluid, a displacement of the second actuating piston 56 in the second actuating piston receptacle 58 is blocked. That is to say, the second actuating piston 56 is locked in the second actuating piston receptacle 58. If the pressure chamber is not charged with control fluid, a displacement of the second actuating piston 56 in the second actuating piston receptacle 58 is enabled.

If a displacement of the second actuating piston 56 is enabled, a cam contour of the second cam 64 is compensated by means of a displacement of the second cam follower 54 within the second actuating piston receptacle 58. The cam contour of the second cam 64 is not transmitted to the gas exchange valves 22. To permit a compensation, a clearance A2 (see FIG. 4) of the second actuating piston receptacle 58 can be greater than a maximum height B2 (see FIG. 4) of the second cam 64.

If a displacement of the second actuating piston 56 is blocked, a cam contour of the second cam 64 is transmitted via the second cam follower 54 to the gas exchange valves 22. Here, the second rocker lever 16 tilts about the rocker lever axle 18 and transmits the tilting movement via the second setting screw 60 to the first rocker lever 14. The first rocker lever 14 actuates the valve bridge 20 so as to open the gas exchange valves 22.

Like the first rocker lever 14, the second rocker lever 16 has a rotational securing means 70. The rotational securing means 70 engages into a longitudinal groove 72 of the second actuating piston 56 in order to prevent a rotation of the second actuating piston 56 about a longitudinal axis of the second actuating piston receptacle 58. The rotational securing means 70 and the longitudinal groove 72 may be designed similarly to the first rotational securing means 46 and the longitudinal groove 48. In particular, the rotational securing means 70, in conjunction with the longitudinal groove 72, forms an axial stop for the second actuating piston 56.

For the lubrication of a rotation of the second cam follower 54, the second cam follower axle 66 has a lubricating fluid longitudinal channel 74 which is designed similarly to the first lubricating fluid longitudinal channel 52 of the first cam follower axle 34.

The blocking piston 28 and the pressure chamber 59 can both be charged jointly with control fluid from the main control fluid channel 44. Thus, the force transmission device 13 can selectively transmit a cam contour of the first cam 32 or a cam contour of the second cam 64 to the gas exchange valves 22.

If control fluid is supplied via the main control fluid channel 44, a displacement of the first actuating piston 26 is enabled, and a displacement of the second actuating piston 56 is blocked. The displacement of the first actuating piston 26 within the first actuating piston receptacle 30 compensates the cam contour of the first cam 32. The blocking of the second actuating piston 56 leads to a transmission of the cam contour of the second cam 64 to the gas exchange valves 22.

If no control fluid is supplied via the main control fluid channel 44, a displacement of the first actuating piston 26 is blocked, and a displacement of the second actuating piston 56 is enabled. The displacement of the second actuating piston 56 within the second actuating piston receptacle 58 compensates the cam contour of the second cam 64. The blocking of the first actuating piston 26 leads to a transmission of the cam contour of the first cam 32 to the gas exchange valves 22.

The first cam 32 and the second cam 34 may be designed entirely independently of one another. In this way, two independent valve stroke curves are available as alternatives for the control of the gas exchange valves 22.

Figure 6:
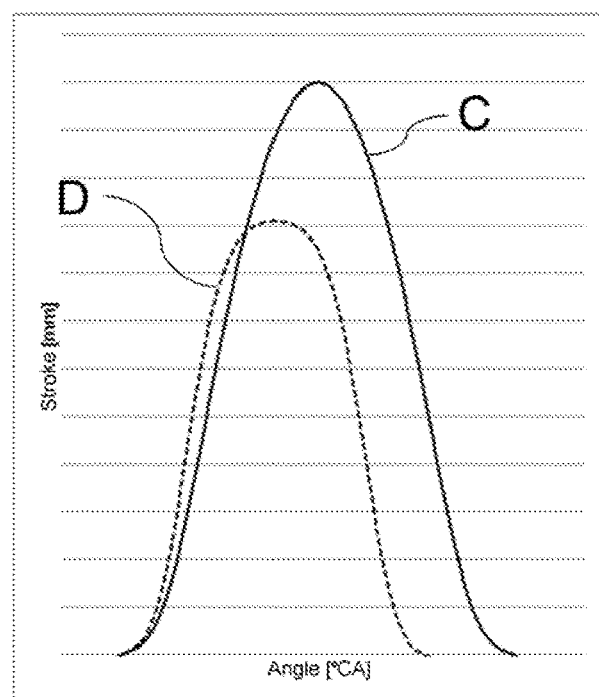
FIG. 6 shows different exemplary valve stroke profiles that can be realized with the force transmission device disclosed herein.

For example, as illustrated in FIG. 6, the first cam 32 may be a normal-stroke cam, which effects a valve stroke curve C of the gas exchange valves 22. Here, the gas exchange valves 22 formed as inlet valves are, in accordance with an Otto-cycle or diesel cycle process, opened in the intake stroke. The second cam 64 may be designed as a Miller cam, which effects the valve stroke curve D of the gas exchange valves 22. Here, the gas exchange valves 22 formed as inlet valves are closed earlier than in the case of the valve stroke curve C. It is self-evidently also possible for the cams 32, 64 to be used for generating other valve stroke curves.

The present disclosure is not restricted to the exemplary embodiments described above. Rather, a multiplicity of variants and modifications are possible, which likewise make use of the concept of the present disclosure and therefore fall within the scope of protection.

LIST OF REFERENCE DESIGNATIONS

10 Variable valve drive
12 Camshaft
13 Force transmission device
14 First rocker lever (first lever device)
16 Second rocker lever (second lever device)
18 Rocker lever axle (lever axle)
20 Valve bridge
22 Gas exchange valve
24 First cam follower
26 First actuating piston
28 Blocking piston
30 First actuating piston receptacle
32 First cam
34 First cam follower axle
36 Elastic element
38 Circumferential groove
40 Elastic element
42 Control fluid supply channel
43 First setting screw
44 Main control fluid channel
46 First rotational securing means
48 Longitudinal groove
50 Second rotational securing means
52 First lubricating fluid longitudinal channel
54 Second cam follower
56 Second actuating piston
58 Second actuating piston receptacle
59 Pressure chamber
60 Second setting screw
62 Projection
64 Second cam
66 Second cam follower axle
68 Control fluid supply channel
70 Rotational securing means
72 Longitudinal groove
74 Lubricating fluid longitudinal channel
A1 Clearance
A2 Clearance
B1 Maximum height
B2 Maximum height
C Valve control curve
D Valve control curve

I claim:

1. A force transmission device for a variable valve drive of an internal combustion engine with at least one gas exchange valve and with a camshaft having a first cam and a second cam, the force transmission device comprising:
   a first lever device configured to produce an operative connection between the first cam and the at least one gas exchange valve, wherein the first lever device has a first cam follower configured to contact the first cam and a first receptacle for the first cam follower, the first cam follower configured to be alternately displaceable or locked within the first receptacle, wherein the first lever device has at least one hydraulically-displaceable blocking piston configured to lock the first cam follower; and
   a second lever device configured to produce an operative connection between the second cam and the at least one gas exchange valve, wherein the second lever device has a second cam follower configured to contact the second cam and a second receptacle for the second cam follower, the second cam follower configured to be alternately displaceable or locked within the second receptacle.

2. The force transmission device according to claim 1, wherein:
   the first cam follower configured to be displaceable within the first receptacle compensates a cam contour of the first cam, and the first cam follower configured to be locked within the first receptacle transmits the cam contour of the first cam to the at least one gas exchange valve; or
   the second cam follower configured to be displaceable within the second receptacle compensates a cam contour of the second cam, and the second cam follower configured to be locked within the second receptacle transmits the cam contour of the second cam to the at least one gas exchange valve.

3. The force transmission device according to claim 1, wherein:
   the first cam follower or the second cam follower is selectively locked; or the first cam follower or the second cam follower is configured to be hydraulically locked.

4. The force transmission device according to claim 1, wherein:
   the first lever device has a rotational securing means which prevents a rotation of the first cam follower about a displacement axis of the first cam follower; or
   the second lever device has a rotational securing means which prevents a rotation of the second cam follower about a displacement axis of the second cam follower.

5. The force transmission device according to claim 1, wherein:
the at least one hydraulically-displaceable blocking piston is elastically preloaded; or
a rotational securing means is provided for the at least one hydraulically-displaceable blocking piston, which rotational securing means prevents a rotation of the at least one hydraulically-displaceable blocking piston about a displacement axis of the at least one hydraulically-displaceable blocking piston.

6. The force transmission device according to claim 1, wherein the second lever device has a hydraulic pressure chamber configured to lock the second cam follower.

7. The force transmission device according to claim 6, wherein:
the at least one hydraulically-displaceable blocking piston and the hydraulic pressure chamber are configured to be jointly loaded; or
a common lever axle of the first lever device and of the second lever device supplies a control fluid to the first cam follower and the second cam follower.

8. The force transmission device according to claim 7, wherein the common lever axle is a rocker lever axle.

9. The force transmission device according to claim 7, wherein the common lever axle includes a lever axle longitudinal channel.

10. The force transmission device according to claim 6, wherein:
a displacement movement of the first cam follower is enabled in a presence of hydraulic loading of the at least one hydraulically-displaceable blocking piston; or
a locking of the first cam follower is enabled in an absence of hydraulic loading of the at least one hydraulically-displaceable blocking piston; or
a locking of the second cam follower is enabled in the presence of hydraulic loading of the hydraulic pressure chamber; or
a displacement movement of the second cam follower is enabled in an absence of hydraulic loading of the hydraulic pressure chamber.

11. The force transmission device according to claim 1, wherein
the first cam follower is mounted in a first actuating piston configured to be axially displaceable in the first receptacle; or
the second cam follower is mounted in a second actuating piston configured to be axially displaceable in the second receptacle.

12. A force transmission device for a variable valve drive of an internal combustion engine with at least one gas exchange valve and with a camshaft having a first cam and a second cam, the force transmission device comprising:
a first lever device configured to produce an operative connection between the first cam and the at least one gas exchange valve, wherein the first lever device has a first cam follower configured to contact the first cam and a first receptacle for the first cam follower, the first cam follower configured to be alternately displaceable or locked within the first receptacle; and
a second lever device configured to produce an operative connection between the second cam and the at least one gas exchange valve, wherein the second lever device has a second cam follower configured to contact the second cam and a second receptacle for the second cam follower, the second cam follower configured to be alternately displaceable or locked within the second receptacle,
wherein the first lever device is formed as a center-pivot rocker lever, or the second lever device is formed as a center-pivot rocker lever.

13. A force transmission device for a variable valve drive of an internal combustion engine with at least one gas exchange valve and with a camshaft having a first cam and a second cam, the force transmission device comprising:
a first lever device configured to produce an operative connection between the first cam and the at least one gas exchange valve, wherein the first lever device has a first cam follower configured to contact the first cam and a first receptacle for the first cam follower, the first cam follower configured to be alternately displaceable or locked within the first receptacle; and
a second lever device configured to produce an operative connection between the second cam and the at least one gas exchange valve, wherein the second lever device has a second cam follower configured to contact the second cam and a second receptacle for the second cam follower, the second cam follower configured to be alternately displaceable or locked within the second receptacle,
wherein the second lever device is supported on the first lever device via a play setting device.

14. A force transmission device for a variable valve drive of an internal combustion engine with at least one gas exchange valve and with a camshaft having a first cam and a second cam, the force transmission device comprising:
a first lever device configured to produce an operative connection between the first cam and the at least one gas exchange valve, wherein the first lever device has a first cam follower configured to contact the first cam and a first receptacle for the first cam follower, the first cam follower configured to be alternately displaceable or locked within the first receptacle; and
a second lever device configured to produce an operative connection between the second cam and the at least one gas exchange valve, wherein the second lever device has a second cam follower configured to contact the second cam and a second receptacle for the second cam follower, the second cam follower configured to be alternately displaceable or locked within the second receptacle,
a control fluid supply configured to hydraulically enable the unlocking of the first cam follower and the locking of the second cam follower, and a lubricating fluid supply configured to lubricate a rotational movement of the first cam follower and the second cam follower, the control fluid supply and the lubricating fluid supply provided separately.

15. A variable valve drive for an internal combustion engine, the variable valve drive comprising:
a camshaft with a first cam and a second cam offset the first cam in a longitudinal direction of the camshaft;
at least one gas exchange valve; and
a force transmission device including:
a first lever device configured to produce an operative connection between the first cam and the at least one gas exchange valve, wherein the first lever device has a first cam follower configured to contact the first cam and a first receptacle for the first cam follower, the first cam follower configured to be alternately displaceable or locked within the first receptacle, wherein the first lever device has at least one hydraulically-displaceable blocking piston configured to lock the first cam follower; and a second lever device configured to produce an operative connection between the second cam and the at least one gas exchange valve, wherein the second lever device has a second cam follower configured to contact the second cam and a second receptacle for the second cam follower, the second cam follower configured to be alternately displaceable or locked within the second receptacle.

16. A motor vehicle, comprising:
a camshaft with a first cam and a second cam offset the first cam in a longitudinal direction of the camshaft;
at least one gas exchange valve; and
a force transmission device including:
a first lever device configured to produce an operative connection between the first cam and the at least one gas exchange valve, wherein the first lever device has a first cam follower configured to contact the first cam and a first receptacle for the first cam follower, the first cam follower configured to be alternately displaceable or locked within the first receptacle, wherein the first lever device has at least one hydraulically-displaceable blocking piston configured to lock the first cam follower; and
a second lever device configured to produce an operative connection between the second cam and the at least one gas exchange valve, wherein the second lever device has a second cam follower configured to contact the second cam and a second receptacle for the second cam follower, the second cam follower configured to be alternately displaceable or locked within the second receptacle.

17. The motor vehicle of claim 16, wherein the motor vehicle is a utility vehicle.

* * * * *